(12) United States Patent
Neidigk et al.

(10) Patent No.: US 12,061,365 B2
(45) Date of Patent: Aug. 13, 2024

(54) MAGNETIC SELF-MATING FIBER OPTIC CONNECTOR AND FIBER OPTIC SWITCH SENSOR

(71) Applicant: National Technology & Engineering Solutions of Sandia, LLC, Albuquerque, NM (US)

(72) Inventors: Stephen Neidigk, Albuquerque, NM (US); Thomas M. Rice, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 18/104,693

(22) Filed: Feb. 1, 2023

(65) Prior Publication Data

US 2023/0161117 A1    May 25, 2023

Related U.S. Application Data

(62) Division of application No. 17/081,260, filed on Oct. 27, 2020, now Pat. No. 11,592,625.

(51) Int. Cl.
*G02B 6/38* (2006.01)
*G01V 8/16* (2006.01)
*G02B 6/35* (2006.01)

(52) U.S. Cl.
CPC .......... *G02B 6/3886* (2013.01); *G01V 8/16* (2013.01); *G02B 6/354* (2013.01); *G02B 6/3572* (2013.01)

(58) Field of Classification Search
CPC .... G02B 6/3572; G02B 6/354; G02B 6/3886; G01V 8/16
See application file for complete search history.

(56) References Cited

U.S. PATENT DOCUMENTS

| 9,869,826 | B1 | 1/2018 | Shang | |
|---|---|---|---|---|
| 11,592,625 | B1* | 2/2023 | Neidigk | ............... G02B 6/3886 |
| 2003/0215172 | A1* | 11/2003 | Koenig | ..................... G01V 8/16 |
| | | | | 385/15 |
| 2009/0016682 | A1* | 1/2009 | Coronado | .............. H01R 43/26 |
| | | | | 385/57 |
| 2020/0379189 | A1 | 12/2020 | Paschalis | |

FOREIGN PATENT DOCUMENTS

JP          2004029633 A       1/2004

* cited by examiner

*Primary Examiner* — Sung H Pak
(74) *Attorney, Agent, or Firm* — Daniel J. Jenkins

(57) ABSTRACT

A system or method for a magnetic self-aligning coupling device for a fiber optic cable. The device includes a first end coupling comprising a first magnet and a second magnet. Both magnets include a mating surface and an annular ring defining an axial aperture. The aperture receives a distal end of a segment of fiber optic cable in a tight fit. The fiber optic cable has an exterior sleeve and a fiber core. The fiber core of the first segment and the second segment of the fiber optic cable are axially aligned by magnetic force in the first and second apertures to create a continuous fiber optic path. A method for detecting a security breach of a door using the self-aligning couplings is also described.

10 Claims, 2 Drawing Sheets

MAGNETIC SELF-MATING FIBER OPTIC CONNECTOR AND FIBER OPTIC SWITCH SENSOR

CROSS-REFERENCE TO RELATED APPLICATION

This application is a divisional application of U.S. application Ser. No. 17/081,260, filed Oct. 27, 2020, entitled "Magnetic Self-Mating Fiber Optic Connector and Fiber Optic Switch Sensor", which is incorporated herein by reference.

STATEMENT REGARDING FEDERALLY SPONSORED RESEARCH OR DEVELOPMENT

This invention was developed under Contract No. DE-NA0003525 awarded by the United States Department of Energy/National Nuclear Security Administration. The Government has certain rights in this invention.

BACKGROUND OF THE INVENTION

The application generally relates to a magnetic connector. The application relates more specifically to a self-aligning magnetic connector for a fiber optic circuit and switch sensor.

Currently a balanced magnetic switch, or BMS, is utilized in a security alarm system as a means of detecting if a door is open or closed. BMS was developed over 40 years ago. The BMS uses magnetic reed switches fixed on, e.g., a door frame, and detects when a permanent magnet fixed to the door move as the door opens. There is a need to effectively detect unauthorized door entries in a security alarm system, for applications including industry, energy, aerospace, and United States government facilities. The BMS is installed in nearly every secure facility in the United States.

Because of security limitation of the BMS technology, high security sites are therefore forced to deploy additional sensor systems to augment the limitations of systems that use BMS sensors. BMS sensors function well for detecting if the monitored door is opened. However, if a monitored door is not opened but merely penetrated, the BMS sensor is not able to detect the penetration.

Alternative intrusion detection systems include Video Analytics to detect door openings. However, Video Analytics may generate nuisance alarms as light levels change. For example, if the lights are switched on or off, or if the lights flicker, a nuisance alarm may be triggered. If the video camera is located in a dark room and directed at the door, light bleeding in from an adjacent hallway may cause a nuisance alarm. Also, variations in ambient sunlight coming through a window, or automobile headlights from a passing automobile, may also generate a nuisance alarm. The need to provide static ambient light conditions has impeded the use of Video Analytics to detect door openings. An Infrared Intrusion Detection System (IRIDS) does not depend on the light level in the secured environment.

Another existing security alarm system employs a Passive Infrared (PIR) sensor. PIRs are also known to generate excessive nuisance alarms. PIR nuisance alarm sources include hot or cold air influx from heating and air conditioning system, hot air and resulting infrared radiation that emanates from hot computers; windows heated by direct sunlight. An IRIDS will not alarm when subjected to these nuisance alarm sources. The IRIDS sensor is not subject to these technical limitations of PIR.

What is needed is a self-aligning magnetic coupling for a fiber optic sensor system and method that utilizes fiber optics to create a circuit for detecting both open and penetrated doors in a security alarm system.

The disclosure is a system and/or method that satisfies one or more of these needs or provides other advantageous features. Other features and advantages will be made apparent from the present specification. The teachings disclosed extend to those embodiments that fall within the scope of the claims, regardless of whether they accomplish one or more of the aforementioned needs.

What is needed is a system and/or method that satisfies one or more of these needs or provides other advantageous features. Other features and advantages will be made apparent from the present specification. The teachings disclosed extend to those embodiments that fall within the scope of the claims, regardless of whether they accomplish one or more of the aforementioned needs.

SUMMARY OF THE INVENTION

One embodiment relates to a magnetic self-aligning coupling device for a fiber optic cable. The magnetic self-aligning coupling device includes a first end coupling comprising a first magnet. The first magnet includes a first mating surface and a first annular ring defining an axial first aperture. The first aperture receives a distal end of a first segment of fiber optic cable. The fiber optic cable has an exterior sleeve and a fiber core. A second end coupling has a second magnet. The second magnet includes a second mating surface and a second annular ring defining an axial second aperture. The second aperture receives a distal end of a second segment of fiber optic cable extending into the second aperture. The fiber optic cable has an exterior sleeve and a fiber core. The fiber core of the first segment and the second segment of the fiber optic cable are axially aligned in the first and second apertures to create a continuous fiber optic path.

Another embodiment relates to a fiber optic sensing switch. The fiber optic sensing switch includes a first module, and a second module disposed opposite the first module and separated by an air gap. Each of the first module and the second module includes a pair of magnetic self-mating fiber optic connectors of opposite polarity. The fiber optic connectors have a first magnet with a first mating surface and first annular ring defining an axial first aperture. The first aperture receives a distal end of a segment of fiber optic cable. The fiber optic cable has an exterior sleeve and a fiber core. Also, a second magnet is included with a second mating surface and a second annular ring defining an axial second aperture. The second aperture receives a second distal end of a second segment of fiber optic cable extending into the second aperture. Each of the first and second connectors is disposed within an annular recess with a distal end of the fiber optic cable segment. The annular recess has an inner diameter greater than an outer diameter of the first or second connector disposed therein to provide a radial gap for flexible movement to allow engagement with an opposing magnet.

Another embodiment relates to a method for detecting a security breach of a protected element includes generating an optical signal by a fiber optic interrogator; sending the optical signal from a light source in the fiber optic interrogator via a fiber optic cable to a fiber optic sensing switch first module; providing within the first module an annular recess having an inner diameter greater than a magnetic connector end; aligning the fiber optic cable with a fiber optic loop via a magnetic coupling having an annular ring supporting the fiber optic cable; transmitting the optical signal to a second module in optical communication with a the fiber optic loop; and returning the optical signal to a light detector in the fiber optic interrogator.

A number of advantages are provided in the disclosed embodiments, which includes a novel security system that utilizes fiber optic continuity sensing.

The disclosed invention uses small, washer shaped, neodymium magnets attached to the ends of a fiber optic to create a magnetic self-aligning fiber optic connector. The magnets are used to self-align and mate the sending and receiving ends of a fiber optic cable.

Another advantage is provided by placing the connectors in a custom designed module, so that the self-aligning connectors may be utilized as a fiber optic switch sensor, generally referred to hereinafter as FOSS. The FOSS enables fiber optic connectivity between two moving objects and can be integrated into applications that were previously not possible due to geometric uncertainties.

Further advantages include magnetic self-aligning fiber optic connectors and a FOSS system that may be applied to many barriers such as personnel doors, garage and roll-up doors, safes, vaults, nets and tarps. As part of a security system, the FOSS would be utilized as a switch to detect if the barrier has been moved relative to a stationary surface. The fiber optic continuity sensor loop would be embedded within the barrier to detect penetration and cutting of the secure barrier.

Alternative exemplary embodiments relate to other features and combinations of features as may be generally recited in the claims.

BRIEF DESCRIPTION OF THE DRAWINGS

The application will become more fully understood from the following detailed description, taken in conjunction with the accompanying figures, wherein like reference numerals refer to like elements, in which.

DETAILED DESCRIPTION OF THE INVENTION

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting. While door security monitoring is described below, the disclosed invention may be practiced with respect to other protected elements, e.g., windows, enclosures, vaults, fences and other means of ingress and egress.

Figure 1:
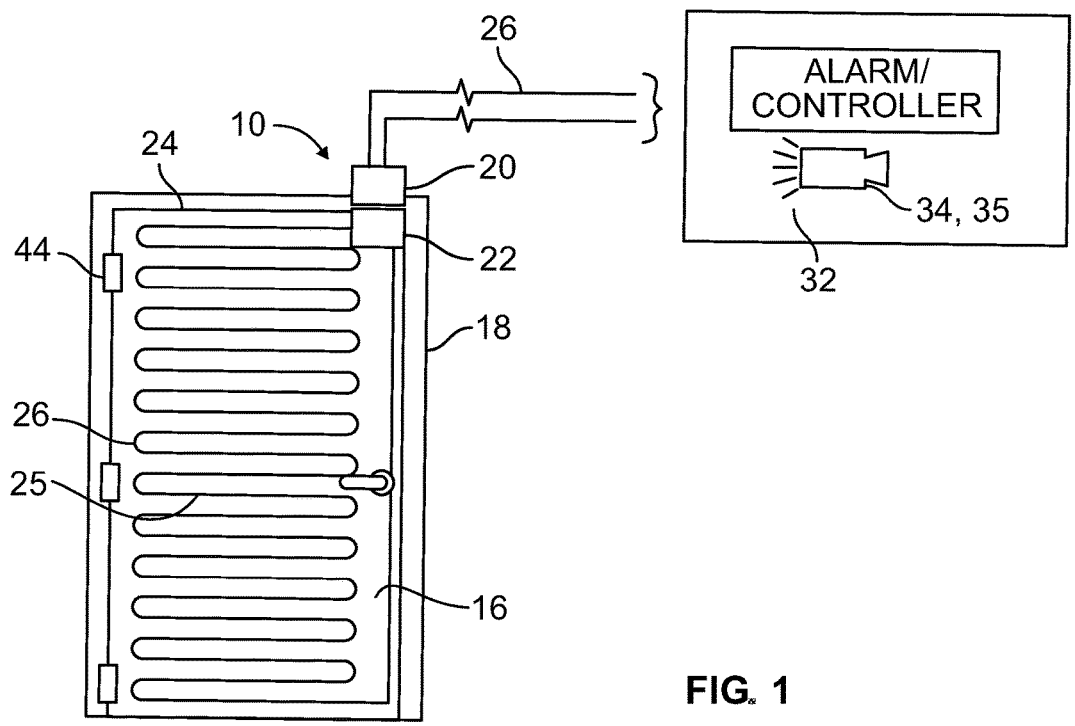
FIG. 1 shows a door arranged with a FOSS installed thereon and a fiber optic cable circuit connected between the frame and door panel.
Figure 2:
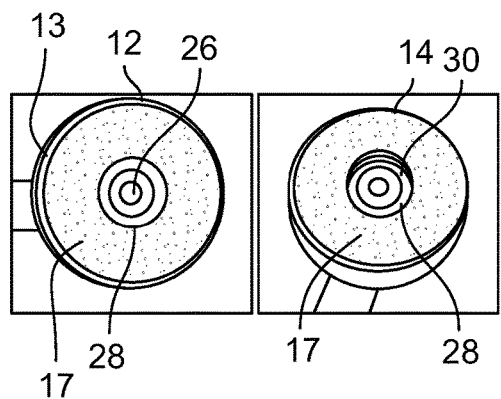
FIG. 2 shows end views of a pair of self-aligning magnetic connector ends.

Referring to FIGS. 1 and 2, a fiber optic security switch, or FOSS 10 includes a pair of magnetic self-mating fiber optic connectors 12, 14, applied to a door 16 and door frame 18. For clarity, it should be understood that magnet connectors 12, 14 are substantially identical magnets distinguishable only by opposite magnetic polarities. In alternate embodiments, magnets 12, 14 may have differing outer radii or aperture radii, so long as symmetry is used to provide alignment. Fiber optic connectors 12, 14 may include a protective exterior shell 13 of metal or plastic to hold magnets 12, 14 and seal sleeve 30 (FIG. 3) from liquid penetration.

FOSS 10 has a first module 20 secured to door frame 18, and a second module 22 secured to door 16. When door 16 is in a closed position in frame 18, first module 20 is disposed directly opposite second module 22 across the gap 24 between frame 18 and door 16. Each module 20, 22 secures a pair of self-mating connectors in place in both the door fame and in the door itself, as described in more detail below. Second module 22 has a pair of magnets 12, 14 of opposite polarity connected at opposite ends of a segment of fiber-optic cable 26. In an embodiment, the door segment of cable 26 is arranged in a serpentine conductive path in door 16. In one embodiment, fiber-optic cable 26 covers most of the surface area of door 16, and comprises a plurality of continuous, generally parallel segments 25 weaving laterally across the door surface and spaced a predetermined distance apart, the spacing determined by the minimum size of an opening that would be considered a security breach that would allow an intruder to access the monitored area. In an alternate embodiment the paths 25 may be arranged in a vertical direction, or in a random pattern with minimum spacing, rather than parallel. Fiber-optic cable 26 conducts optical signals between module 20 and module 22, through door 16.

Referring next to FIG. 2, an end view of each of the magnetic self-mating fiber optic connectors 12, 14 is shown. Each fiber optic connector 12, 14 comprises an annular ring with an aperture 28. Aperture 28 is sized for receiving a plastic core fiber optic cable 26. Cable 26 may be secured within aperture 28 by a bonding material or by a friction fit. Fiber optic cable 26 includes an exterior sleeve 30 that is bonded to the outer fiber optic cable 26. Sleeve 30 increases the diameter of fiber optic cable 26 to fit snugly within aperture 28 of the corresponding washer-shaped magnet 12, 14. Magnets 12, 14 have a generally planar mating surface 17 that comes into opposing contact when placed in proximity with one another. In an embodiment, magnets may be made from neodymium, or NdFeB. Similar rare-earth magnets or permanent magnets may be used in other embodiments.

A pair of magnets 12, 14 having attracting magnetic poles in alignment creates a self-mating fiber optic connection. Frame module 20 houses a sending end and a receiving end of the connection. The sending end is in optical communication with a light source 32 of a fiber optic interrogator 34 (FIG. 1). Receiving end is in optical communication with the light detector side of the fiber optic interrogator 34.

Figure 3:
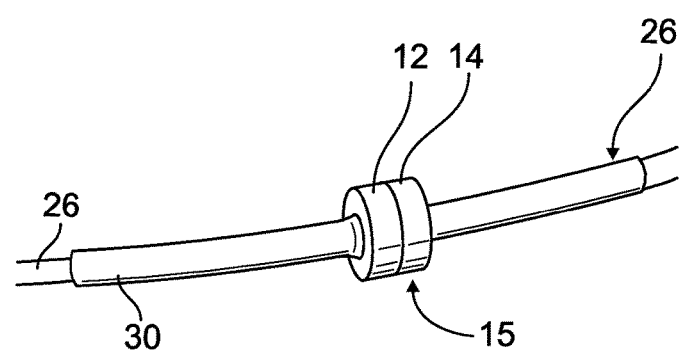
FIG. 3 shows a fiber optic terminal coupled by self-aligning magnetic connectors.

FIG. 3 shows a section of fiber optic cable 26 fiber optic terminal 15 coupled by self-aligning magnetic connectors 12, 14. Sleeve 30 enters fiber optic connectors 12, 14 through exterior shell 13, and connectors 12, 14 align separate sections of fiber optic cable 26.

Figure 4:
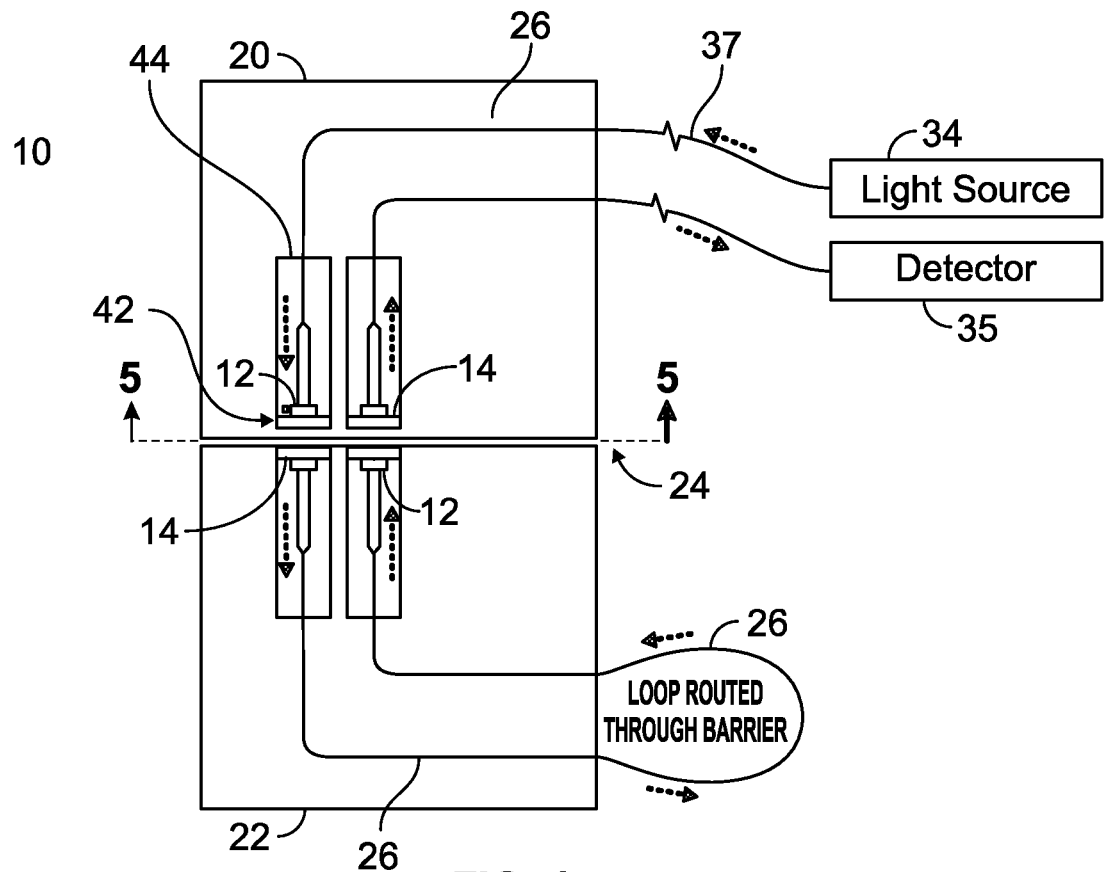
FIG. 4 shows a cross-sectional view of opposing modules with self-aligning magnetic connectors.

Referring next to FIG. 4 a cross-sectional view of opposing modules with self-aligning magnetic connectors 12, 14 is shown. Magnetic self-mating fiber optic connectors 12, 14 form a continuous loop through fiber optic cable 26, including a FOSS arrangement 10.

Fiber optic cable 26 is secured in each module 20, 22, and is spaced away from the distal end of cable 26 where magnet 12, 14, respectively, is attached, thus allowing the magnet sufficient space to flex and align with the adjacent magnet 14, 12, respectively, of opposite magnetic polarity. Two pairs of magnetic connectors mate with one another forming a continuous fiber optic cable loop. Two pairs of self-aligning fiber optic magnet connectors are utilized in the FOSS configuration. For a door 16, fiber optic cable 26 comprises a continuous loop that is routed through and embedded inside the door. If the fiber optic cable 26 is cut or otherwise becomes discontinuous, light from the optical signal is prevented from being received at detector 35, and an alarm condition is generated by detector 35. The direction of light transmission is indicated by arrows 37. Cable 26 may be routed on an exterior of the door 16 in another embodiment.

Due to the self-aligning nature of the magnets 12, 14, as opposing ends of the connection move nearer to one another, the magnetic poles begin to align, and the magnets attract. Therefore, when the connection is pulled apart and magnets 12, 14 are separated, the axially disposed apertures 28 of magnets 12, 14 maintain alignment with each other. The fiber optic cables 26 fixed within the center aperture of the magnets are thus forced to point directly at one another. Depending on the type of fiber optic and interrogator selected, the light signal continues to travel across the connection as magnets 12, 14 of opposing polarity are pulled apart. This phenomena in a controlled fixture allows for integration into new, previously not possible applications.

Detecting whether a door is open or closed is an exemplary application using the magnetic self-aligning fiber optic connector as a switch, or FOSS. The magnet connectors are used in combination with a breach detection loop of fiber optic cable 26 routed through the door resulting in a system capable of detecting a position of door 16 relative to door frame 18, i.e., open or closed, and whether door 16 is being penetrated via loss of continuity.

Geometric variability exists between door 16 and door frame 18. To use fiber optic continuity as a detection mechanism in a switch, tolerance flexibility must be achieved. To accomplish this flexibility, a method to implement magnetic self-aligning connectors in a door assembly has been described.

As described above with respect to FIG. 1, fiber optic interrogator 34 transmits a light signal into a length of fiber optic cable 26, and a light detector 35 detects the light signal returning to interrogator 34 at the opposite end of cable 26. If the expected light signal is detected by detector 35, then interrogator 34 is in the "alarm off" state. If the expected light signal is not received by detector 35, then interrogator 34 switches to an "alarm on" state.

Figure 5:
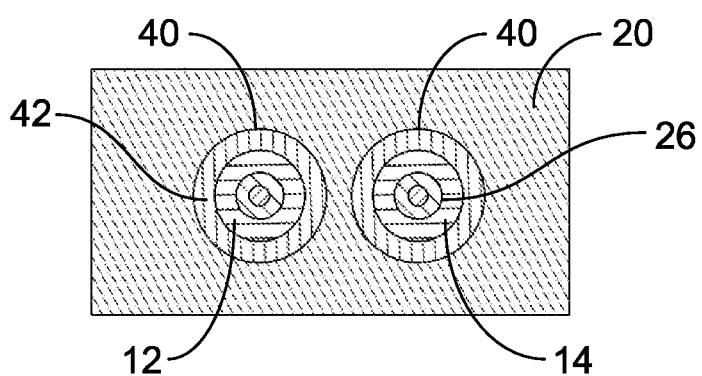
FIG. 5 shows a cross-sectional end view taken along the lines 5-5 in FIG. 4.

Referring next to FIGS. 4 and 5, FOSS 10 includes module 20 and module 22 positioned opposite one another across a door gap 24. Module 20 has an embedded fiber optic cable 26 for a transmitted light signal propagating from light source 34, in a direction indicated by directional arrow 37. Cable 26 enters a hollow annular recess 40 in module 20. Annular recess 40 has an inner diameter greater than an outer diameter of magnets 12 or 14. A radial gap 42 between the inner wall of recess 40 and outer wall of magnet 12 or 14 provides axial flexibility for coupling cable 26. The connecter end of cable 26 at magnet 12, 14 is not rigidly secured in module 20. Fiber optic cable 26 is secured in module 20 a distance from the magnet equal to the length of recess 40, allowing the connector end of the fiber optic and corresponding magnet to move into position and self-align with the magnet on the opposing side of FOSS 10. FIG. 5 shows the arrangement of circular magnets 12, 14 within the larger annulus 42 of recess 40, to move axially around 360 degrees.

Referring again to FIG. 1, door 16 is mounted to frame 18 via hinges 44. Hinges allowing two pairs of magnetic self-aligning fiber optic connectors 12, 14 in modules 20, 22, to pass adjacent one other. In the door closed position, continuity of fiber optic cable 26 is achieved, and detector 35 reads the input signal from the light source 34. When the two parts of the assembly are rotated, the fiber optic cables 26 are no longer aligned and detector 35 does not receive light, setting off an alarm. Depending on the fiber optic interrogator selected and sensitivity required, a gap between the upper and lower portion of the assembly can be varied within about 3.175 millimeters (0.125 inch).

While the exemplary embodiments described herein relate to a door security monitoring system associated with a door, it is important to note that the construction and arrangement of the fiber optic switch sensor, as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

It should be noted that although the figures herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule based logic and other logic to accomplish the various connection steps, processing steps, comparison steps and decision steps.

The invention claimed is:

1. A fiber optic sensing switch comprising:
    a first module, and a second module disposed opposite the first module and separated by an air gap;
    each of the first module and the second module comprising pair of magnetic self-mating fiber optic connectors of opposite polarity, comprising:
        a first magnet comprising a first mating surface and first annular ring defining an axial first aperture; the first aperture for receiving a first distal end of a first segment of fiber optic cable;

a second magnet comprising a second mating surface and a second annular ring defining an axial second aperture; the aperture for receiving a second distal end of a second segment of fiber optic cable extending into the second aperture; and each of the first and second connectors disposed within an annular recess with a distal end of the fiber optic cable;

the annular recess having an inner diameter greater than an outer diameter of the first or second connector disposed therein to provide a radial gap therebetween for flexible movement to allow engagement with an opposing magnet.

2. The fiber optic sensor switch of claim 1, wherein the first module comprising a sending end associated with the first magnet, and a receiving end associated with the second end;

the sending end in optical communication with a light source of a fiber optic interrogator; and the receiving end in optical communication with a light detector side of the fiber optic interrogator.

3. The fiber optic sensor switch of claim 1, wherein the second module first magnet and the second magnet are connected to respective first and second ends of a fiber optic cable segment; and wherein the first magnet is magnetically engageable with the first module first magnet; and wherein the second magnet is magnetically engageable with the first module second magnet to form an optical path.

4. The fiber optic sensor switch of claim 3, wherein the first module first and second magnets and the second module first and second magnets form an optical path with the fiber optic interrogator when magnetically engaged.

5. The fiber optic sensor switch of claim 3, wherein the fiber optic cable segment comprises a loop that is routed through and embedded inside of a door.

6. The fiber optic sensor switch of claim 2, wherein the fiber optic interrogator is configured to generate an alarm in response to the fiber optic cable being discontinuous, wherein a light from the light source is prevented from being received at the light detector.

7. The fiber optic sensor switch of claim 1, wherein the fiber optic cable comprises an exterior sleeve and a fiber core.

8. A method for detecting a security breach of a protected element, comprising:

generating an optical signal by a fiber optic interrogator;

sending the optical signal from a light source in the fiber optic interrogator via a fiber optic cable to a fiber optic sensing switch first module;

providing within the first module an annular recess having an inner diameter greater than a magnetic connector end;

aligning the fiber optic cable with a fiber optic loop via a magnetic coupling having an annular ring supporting the fiber optic cable;

transmitting the optical signal to a second module in optical communication with the fiber optic loop;

returning the optical signal to a light detector in the fiber optic interrogator.

9. The method of claim 8, further comprising:

providing a gap between the annular ring and the annular recess for flexibility.

10. The method of claim 8, further comprising:

generating an alarm condition in response to an interruption of the optical signal between the light source and the light detector.

* * * * *